US008688082B2

(12) United States Patent
Sigmund et al.

(10) Patent No.: US 8,688,082 B2
(45) Date of Patent: *Apr. 1, 2014

(54) SYSTEMS AND METHODS FOR CONSOLIDATING WIRELINE AND WIRELESS VOICEMAIL BOXES

(71) Applicant: AT&T Mobility II LLC, Atlanta, GA (US)

(72) Inventors: William Joseph Sigmund, Cumming, GA (US); Michael Robert Zubas, Marietta, GA (US); Brian Keith Rainer, Lawrenceville, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/785,710

(22) Filed: Mar. 5, 2013

(65) Prior Publication Data

US 2013/0183941 A1    Jul. 18, 2013

Related U.S. Application Data

(63) Continuation of application No. 12/161,027, filed on Jul. 16, 2008, now Pat. No. 8,406,743.

(60) Provisional application No. 60/969,419, filed on Aug. 31, 2007.

(51) Int. Cl.
*H04M 11/00* (2006.01)
*H04M 3/493* (2006.01)
*H04M 1/64* (2006.01)
*G06F 15/16* (2006.01)

(52) U.S. Cl.
USPC .................. 455/413; 455/412.2; 379/88.18; 379/88.22; 709/209

(58) Field of Classification Search
USPC ................. 455/412.1, 412.2, 413; 379/88.11, 379/88.18, 88.22, 88.25; 709/208, 209, 211
See application file for complete search history.

(56) References Cited

U.S. PATENT DOCUMENTS

| | | | |
|---|---|---|---|
| 5,329,579 | A | 7/1994 | Brunson |
| 5,524,137 | A | 6/1996 | Rhee |
| 5,572,578 | A | 11/1996 | Lin et al. |
| 5,737,394 | A | 4/1998 | Anderson et al. |
| 5,737,395 | A | 4/1998 | Irribarren |

(Continued)

FOREIGN PATENT DOCUMENTS

| | | |
|---|---|---|
| EP | 0 631 452 | 12/1994 |
| EP | 1 113 631 | 7/2001 |

(Continued)

OTHER PUBLICATIONS

U.S. Notice of Allowance dated May 26, 2011 in U.S. Appl. No. 12/201,945.

(Continued)

*Primary Examiner* — Christopher M Brandt
(74) *Attorney, Agent, or Firm* — Hartman & Citrin LLC

(57) ABSTRACT

Voicemail systems can include a memory and a processor. The memory can store data relating to users. An incoming communication can be handled by the voicemail system, forwarded to another voicemail system, provided with functionality based upon a user's preferences, and the like. The voicemail systems can include functionality to allow a user to consolidate voicemail messages and/or calls at one or more designated destinations, for example, a voicemail system and/or a mobile device.

20 Claims, 8 Drawing Sheets

(56) References Cited

U.S. PATENT DOCUMENTS

| | | |
|---|---|---|
| 5,809,111 A | 9/1998 | Matthews |
| 6,005,870 A | 12/1999 | Leung et al. |
| 6,108,559 A | 8/2000 | Astrom et al. |
| 6,148,212 A | 11/2000 | Park et al. |
| 6,246,871 B1 | 6/2001 | Ala-Laurila |
| 6,335,962 B1 | 1/2002 | Ali et al. |
| 6,351,523 B1 | 2/2002 | Detlef |
| 6,360,272 B1 | 3/2002 | Lincke et al. |
| 6,480,885 B1 | 11/2002 | Olivier |
| 6,522,727 B1 | 2/2003 | Jones |
| 6,751,298 B2 | 6/2004 | Bhogal et al. |
| 6,829,334 B1 | 12/2004 | Zirngibl |
| 6,868,143 B1 | 3/2005 | Menon et al. |
| 6,879,847 B1 | 4/2005 | Kato |
| 6,912,275 B1 | 6/2005 | Kaplan |
| 6,937,868 B2 | 8/2005 | Himmel et al. |
| 6,981,023 B1 | 12/2005 | Hamilton et al. |
| 7,095,828 B1 | 8/2006 | Elliot et al. |
| 7,142,648 B1 | 11/2006 | Miller |
| 7,171,186 B2 | 1/2007 | Miyachi et al. |
| 7,248,857 B1 | 7/2007 | Richardson et al. |
| 7,277,529 B1 | 10/2007 | Wuthnow et al. |
| 7,283,809 B1 | 10/2007 | Weinman |
| 7,369,648 B1 | 5/2008 | Chang |
| 7,680,491 B2 | 3/2010 | Zabawskyj et al. |
| 7,738,833 B2 | 6/2010 | Bettis et al. |
| 7,796,977 B2 | 9/2010 | Vander Veen |
| 7,826,831 B2 | 11/2010 | Bettis et al. |
| 7,894,580 B2 | 2/2011 | Veen et al. |
| 8,320,535 B2 | 11/2012 | Alperin et al. |
| 2002/0015403 A1 | 2/2002 | McConnell et al. |
| 2002/0037075 A1 | 3/2002 | Flanagan |
| 2002/0049768 A1 | 4/2002 | Peek et al. |
| 2002/0077098 A1 | 6/2002 | Tilks et al. |
| 2002/0112007 A1 | 8/2002 | Wood et al. |
| 2002/0115429 A1 | 8/2002 | Deluca et al. |
| 2003/0091169 A1 | 5/2003 | Cain |
| 2003/0099341 A1 | 5/2003 | Williams |
| 2003/0220784 A1 | 11/2003 | Fellenstein et al. |
| 2004/0023643 A1 | 2/2004 | Vander Veen et al. |
| 2004/0081088 A1 | 4/2004 | Schinner et al. |
| 2004/0139471 A1 | 7/2004 | Geen et al. |
| 2004/0146147 A1 | 7/2004 | Picard et al. |
| 2004/0248594 A1 | 12/2004 | Wren |
| 2004/0252679 A1 | 12/2004 | Williams et al. |
| 2004/0264658 A1 | 12/2004 | Cline et al. |
| 2005/0089149 A1 | 4/2005 | Elias |
| 2005/0102368 A1 | 5/2005 | Forman et al. |
| 2005/0113078 A1 | 5/2005 | Deitrich |
| 2005/0186944 A1 | 8/2005 | True et al. |
| 2005/0213715 A1 | 9/2005 | Winick |
| 2006/0003745 A1 | 1/2006 | Gogic |
| 2006/0025114 A1 | 2/2006 | Bales et al. |
| 2006/0025140 A1 | 2/2006 | Bales et al. |
| 2006/0031470 A1 | 2/2006 | Chen et al. |
| 2006/0059361 A1 | 3/2006 | Paden |
| 2006/0062356 A1 | 3/2006 | Vendrow |
| 2006/0171511 A1 | 8/2006 | Liu et al. |
| 2006/0173959 A1 | 8/2006 | McKelvie et al. |
| 2006/0239419 A1 | 10/2006 | Joseph et al. |
| 2006/0251222 A1 | 11/2006 | Abramson et al. |
| 2006/0253584 A1 | 11/2006 | Dixon et al. |
| 2006/0281443 A1 | 12/2006 | Chen et al. |
| 2007/0038483 A1 | 2/2007 | Wood |
| 2007/0066284 A1 | 3/2007 | Gatzke et al. |
| 2007/0127632 A1 | 6/2007 | Swingle et al. |
| 2007/0127663 A1 | 6/2007 | Bae |
| 2007/0140443 A1 | 6/2007 | Woodring |
| 2007/0143106 A1 | 6/2007 | Dunsmuir |
| 2007/0173233 A1 | 7/2007 | Vander Veen et al. |
| 2007/0180032 A1 | 8/2007 | Pearson |
| 2007/0180504 A1 | 8/2007 | Hung |
| 2007/0207785 A1 | 9/2007 | Chatterjee et al. |
| 2007/0213050 A1 | 9/2007 | Jiang |
| 2007/0223666 A1 | 9/2007 | Teague |
| 2007/0239833 A1 | 10/2007 | Alperin et al. |
| 2007/0287453 A1 | 12/2007 | Wang |
| 2008/0008163 A1 | 1/2008 | Castell et al. |
| 2008/0008299 A1 | 1/2008 | Didcock et al. |
| 2008/0056459 A1 | 3/2008 | Vallier et al. |
| 2008/0062246 A1 | 3/2008 | Woodworth et al. |
| 2008/0062938 A1 | 3/2008 | Gil-soo et al. |
| 2008/0081609 A1 | 4/2008 | Burgan et al. |
| 2008/0140767 A1 | 6/2008 | Rao et al. |
| 2008/0167007 A1 | 7/2008 | Novick et al. |
| 2008/0167010 A1 | 7/2008 | Novick et al. |
| 2008/0167014 A1 | 7/2008 | Novick et al. |
| 2008/0188204 A1 | 8/2008 | Gavner et al. |
| 2008/0200152 A1 | 8/2008 | Moore |
| 2008/0207176 A1 | 8/2008 | Brackbill et al. |
| 2008/0243513 A1 | 10/2008 | Bucchieri et al. |
| 2008/0260118 A1 | 10/2008 | Lyle |
| 2008/0298459 A1 | 12/2008 | Yang et al. |
| 2008/0300873 A1 | 12/2008 | Siminoff |
| 2009/0149220 A1 | 6/2009 | Camilleri et al. |
| 2009/0239507 A1 | 9/2009 | Sigmund et al. |
| 2009/0253407 A1 | 10/2009 | Sigmund et al. |
| 2009/0253412 A1 | 10/2009 | Sigmund et al. |
| 2009/0253413 A1 | 10/2009 | Sigmund et al. |
| 2010/0159886 A1 | 6/2010 | Sigmund et al. |
| 2010/0159888 A1 | 6/2010 | Sigmund et al. |
| 2010/0159889 A1 | 6/2010 | Sigmund et al. |
| 2010/0159890 A1 | 6/2010 | Sigmund et al. |
| 2010/0159891 A1 | 6/2010 | Sigmund et al. |
| 2010/0166161 A1 | 7/2010 | Dhawan et al. |
| 2010/0167699 A1 | 7/2010 | Sigmund et al. |
| 2010/0189229 A1 | 7/2010 | Sigmund et al. |
| 2010/0195807 A1 | 8/2010 | Sigmund et al. |
| 2010/0222024 A1 | 9/2010 | Sigmund et al. |
| 2011/0085646 A1 | 4/2011 | Sigmund et al. |
| 2013/0010937 A1 | 1/2013 | Sigmund et al. |
| 2013/0012173 A1 | 1/2013 | Sigmund et al. |

FOREIGN PATENT DOCUMENTS

| | | |
|---|---|---|
| EP | 1 434 415 | 6/2004 |
| EP | 1 599 022 | 11/2005 |
| KR | 20050001246 | 1/2005 |
| WO | WO 97/45991 | 12/1997 |
| WO | WO 98/03005 | 1/1998 |
| WO | WO 00/73947 | 12/2000 |
| WO | WO 02/065745 | 8/2002 |
| WO | WO 2004/046895 | 6/2004 |
| WO | WO 2007/081929 | 7/2007 |
| WO | WO 2007/095510 | 8/2007 |
| WO | WO 2007/096866 | 8/2007 |
| WO | WO 2008/034555 | 3/2008 |
| WO | WO 2009/029296 | 3/2009 |
| WO | WO 2009/029297 | 3/2009 |
| WO | WO 2009/029298 | 3/2009 |
| WO | WO 2009/029313 | 3/2009 |
| WO | WO 2009/029314 | 3/2009 |
| WO | WO 2009/029323 | 3/2009 |
| WO | WO 2009/029324 | 3/2009 |
| WO | WO 2009/029328 | 3/2009 |
| WO | WO 2009/029330 | 3/2009 |
| WO | WO 2010/002382 | 1/2010 |

OTHER PUBLICATIONS

U.S. Official Action dated Sep. 19, 2011 in U.S. Appl. No. 12/477,971.

U.S. Official Action dated Apr. 25, 2012 in U.S. Appl. No. 12/477,971.

U.S. Notice of Allowance dated Nov. 21, 2012 in U.S. Appl. No. 12/477,971.

U.S. Official Action dated Oct. 13, 2011 in U.S. Appl. No. 12/485,335.

U.S. Official Action dated May 22, 2012 in U.S. Appl. No. 12/485,335.

U.S. Notice of Allowance dated Nov. 23, 2012 in U.S. Appl. No. 12/485,335.

U.S. Official Action dated Oct. 4, 2012 in U.S. Appl. No. 12/485,484.

(56) References Cited

OTHER PUBLICATIONS

U.S. Official Action dated Oct. 2, 2012 in U.S. Appl. No. 12/485,961.
U.S. Official Action dated Apr. 27, 2012 in U.S. Appl. No. 12/160,931.
U.S. Official Action dated Aug. 30, 2012 in U.S. Appl. No. 12/160,931.
U.S. Official Action dated Dec. 22, 2010 in U.S. Appl. No. 12/160,940.
U.S. Official Action dated May 31, 2011 in U.S. Appl. No. 12/160,940.
U.S. Official Action dated Apr. 24, 2012 in U.S. Appl. No. 12/160,940.
U.S. Notice of Allowance dated Oct. 25, 2012 in U.S. Appl. No. 12/160,940.
U.S. Official Action dated Apr. 26, 2012 in U.S. Appl. No. 12/160,946.
U.S. Official Action dated Oct. 11, 2012 in U.S. Appl. No. 12/160,946.
U.S. Official Action dated Nov. 4, 2011 in U.S. Appl. No. 12/160,956.
U.S. Official Action dated Jun. 6, 2012 in U.S. Appl. No. 12/160,956.
U.S. Official Action dated Jan. 12, 2011 in U.S. Appl. No. 12/161,021.
U.S. Official Action dated Jun. 1, 2011 in U.S. Appl. No. 12/161,021.
U.S. Official Action dated Dec. 15, 2011 in U.S. Appl. No. 12/161,021.
U.S. Official Action dated Jun. 21, 2012 in U.S. Appl. No. 12/161,021.
U.S. Official Action dated Nov. 29, 2010 in U.S. Appl. No. 12/161,027.
U.S. Official Action dated May 10, 2011 in U.S. Appl. No. 12/161,027.
U.S. Official Action dated Nov. 23, 2011 in U.S. Appl. No. 12/161,027.
U.S. Official Action dated Jul. 30, 2012 in U.S. Appl. No. 12/161,027.
U.S. Notice of Allowance dated Nov. 16, 2012 in U.S. Appl. No. 12/161,027.
U.S. Official Action dated Dec. 27, 2010 in U.S. Appl. No. 12/161,033.
U.S. Official Action dated May 31, 2011 in U.S. Appl. No. 12/161,033.
U.S. Official Action dated Nov. 29, 2011 in U.S. Appl. No. 12/161,033.
U.S. Official Action dated Jun. 6, 2012 in U.S. Appl. No. 12/161,033.
U.S. Notice of Allowance dated Jul. 24, 2012 in U.S. Appl. No. 12/161,033.
U.S. Official Action dated Dec. 23, 2010 in U.S. Appl. No. 12/161,035.
U.S. Official Action dated Jun. 2, 2011 in U.S. Appl. No. 12/161,035.
U.S. Official Action dated Dec. 2, 2011 in U.S. Appl. No. 12/161,035.
U.S. Official Action dated Jul. 18, 2012 in U.S. Appl. No. 12/161,035.
U.S. Official Action dated Jan. 24, 2011 in U.S. Appl. No. 12/161,064.
U.S. Official Action dated Jul. 8, 2011 in U.S. Appl. No. 12/161,064.
U.S. Official Action dated Jan. 30, 2012 in U.S. Appl. No. 12/161,064.
U.S. Official Action dated Sep. 14, 2012 in U.S. Appl. No. 12/161,064.
U.S. Official Action dated Jan. 19, 2011 in U.S. Appl. No. 12/161,076.
U.S. Official Action dated Jul. 1, 2011 in U.S. Appl. No. 12/161,076.
U.S. Official Action dated Jan. 17, 2012 in U.S. Appl. No. 12/161,076.
U.S. Notice of Allowance dated Jul. 17, 2012 in U.S. Appl. No. 12/161,076.
U.S. Notice of Allowance dated Dec. 27, 2012 in U.S. Appl. No. 13/616,198.
U.S. Notice of Allowance dated Jan. 31, 2013 in U.S. Appl. No. 12/485,961.
International Search Report & Written Opinion dated Sep. 18, 2008 in PCT Application PCT/US08/67612.
International Search Report & Written Opinion dated Aug. 1, 2008 in PCT Application PCT/US08/61493.
International Search Report & Written Opinion dated Nov. 12, 2008 in PCT Application PCT/US08/65046.
International Search Report & Written Opinion dated Mar. 13, 2009 in PCT Application PCT/US08/68738.
International Search Report & Written Opinion dated Oct. 29, 2008 in PCT Application PCT/US08/67176.
International Search Report & Written Opinion dated Sep. 4, 2008 in PCT Application PCT/US08/54074.
International Search Report & Written Opinion dated Sep. 3, 2008 in PCT Application PCT/US08/61592.
International Search Report & Written Opinion dated Sep. 4, 2008 in PCT Application PCT/US08/67152.
International Search Report & Written Opinion dated Nov. 6, 2008 in PCT Application PCT/US08/67591.
International Search Report & Written Opinion dated Aug. 28, 2008 in PCT Application PCT/US08/61437.
Sigmund et al., U.S. Appl. No. 13/654,480, filed Oct. 18, 2012.
Sigmund et al., U.S. Appl. No. 13/751,505, filed Jan. 28, 2013.
U.S. Notice of Allowance mailed on Feb. 28, 2013 in U.S. Appl. No. 12/161,064.
U.S. Official Action mailed on Feb. 28, 2013 in U.S. Appl. No. 13/654,480.
U.S. Office Action mailed on Aug. 16, 2013 in U.S. Appl. No. 13/654,480.
U.S. Office Action mailed on Oct. 22, 2013 in U.S. Appl. No. 13/930,210.
U.S. Office Action mailed on Jan. 21, 2014 in U.S. Appl. No. 13/654,480.
U.S. Office Action mailed on Dec. 30, 2013 in U.S. Appl. No. 12/160,940.

SYSTEMS AND METHODS FOR CONSOLIDATING WIRELINE AND WIRELESS VOICEMAIL BOXES

RELATED APPLICATION

This application is a continuation of U.S. patent application Ser. No. 12/161,027, now U.S. Pat. No. 8,406,743 entitled "Systems and Methods for Consolidating Wireline and Wireless Voicemail Boxes," filed on Jul. 16, 2008, which is incorporated by reference in its entirety, and which claims priority to U.S. Provisional Patent Application No. 60/969,419, filed Aug. 31, 2007, which is incorporated by reference in its entirety.

TECHNICAL FIELD

The present disclosure relates generally to voicemail platforms for communications devices. More particularly, the present disclosure relates to systems and methods for consolidating wireline and wireless voicemail boxes.

BACKGROUND

Voicemail is a popular telephone service feature, and is often included in the price paid for telephone service. When a called line with voicemail functionality does not answer or is busy, a call can be handled by a voicemail system. A voicemail system can store recordings and/or announcements for a user. When a call is passed to a voicemail system, the voicemail system can play one or more recordings and/or announcements for the calling party or a generic message and can prompt the calling party to leave a message, for example, a spoken message. The voicemail system can record the calling party's message and store the message, for example, as audio data in a storage device. Call data associated with the message, for example, the calling party's telephone number, the date and time of the call, and the like, can also be stored by the voicemail system and associated with the stored message. Some voicemail systems also allow calling parties to leave alphanumeric messages for a called party. In any event, the voicemail system can store the message or data and associated call data.

Among the close to 100 million cellular telephone service users in the United States, a growing trend includes making a cellular telephone service a user's primary telephone service. As such, a user's cellular telephone service, and voicemail service associated with a cellular telephone line, can be relied upon by a user to report most, if not all, missed telephone calls, whether those calls relate to personal or business matters.

The increased reliance upon cellular telephone service has been accompanied by a corresponding increased demand and increased reliance upon other cellular telephone features and functionality, for example, text messaging, email, Internet browsing, voicemail, data transfer, and other features. As reliance upon and demand for cellular telephone services and voicemail increases, demand for enhanced voicemail services will likely continue to experience a corresponding increase.

SUMMARY

A system for storing at least one voicemail message at a master voicemail system can include at least one slave voicemail system in communication with a master voicemail system. The voicemail message can be associated with a call received by the slave voicemail systems or the master voicemail system. A call can be handled by the voicemail system that receives the call, or the call can be transferred to another voicemail system for handling. Handling can include storing a message in one or more formats, storing call data associated with the call, generating source data associated with the message, associating various message components with one another to represent a message, and storing the message in a memory location. One or more of the voicemail systems can be connected to a cellular network. A device can be in communication with the cellular network and to the master voicemail system. The at least one voicemail message can be transferred from the MVMS to the device and stored by the device in a device memory. The at least one voicemail message can include audio data, text data, video data, or a combination thereof. The voicemail system can include additional functionality including, but not limited to, translation applications, forwarding applications, conversion applications, speech to text applications, combinations thereof, and the like.

A method for consolidating voicemail messages associated with multiple voicemail systems can include receiving a call at a voicemail system, and storing a message associated with the call at a voicemail system memory. The method can further include determining at the voicemail system if the voicemail system is configured as a slave voicemail system or a master voicemail system. In some embodiments, if the voicemail system is configured as a slave voicemail system, the method can include passing the call to a master voicemail system. The storing can include storing the message and call data at a memory location associated with the master voicemail system. In other embodiments, if the voicemail system is configured as a slave voicemail system, the method can include storing message content and call data at a memory location associated with the slave voicemail system and transferring the stored message content and call data to the master voicemail system. In some embodiments, the master voicemail system generates data relating to the voicemail system to which the call was originally directed, and associates the generated source data with the message content and the call data. In other embodiments, if the voicemail system is configured as a slave voicemail system, the method further includes storing message content and call data at a memory location associated with the slave voicemail system, sending a notification to the master voicemail system that a message has been deposited at the slave voicemail system, receiving, at the slave voicemail system a request to transfer the stored message content and call data to the master voicemail system, and transferring the stored message content and call data to the master voicemail system. The storing a message can include storing audio data, text data, video data, or combinations thereof.

A device for storing messages associated with at least two voicemail systems can include a memory for storing messages and a communications component for communicatively coupling the device with a master voicemail system. The communications component can include one or more transceivers. The master voicemail system can be configured to store messages associated with the at least two voicemail systems, and to transfer the messages to the device. The messages can be stored as audio data, text data, video data, or a combination thereof. One or more of the voicemail systems can be plain old voicemail systems and/or visual voicemail systems.

These and additional features of the present disclosure will become apparent with reference to the attached drawings, wherein:

DESCRIPTION

As required, detailed embodiments of the present disclosure are disclosed herein. It must be understood that the disclosed embodiments are merely exemplary examples of the disclosure that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

Figure 1:
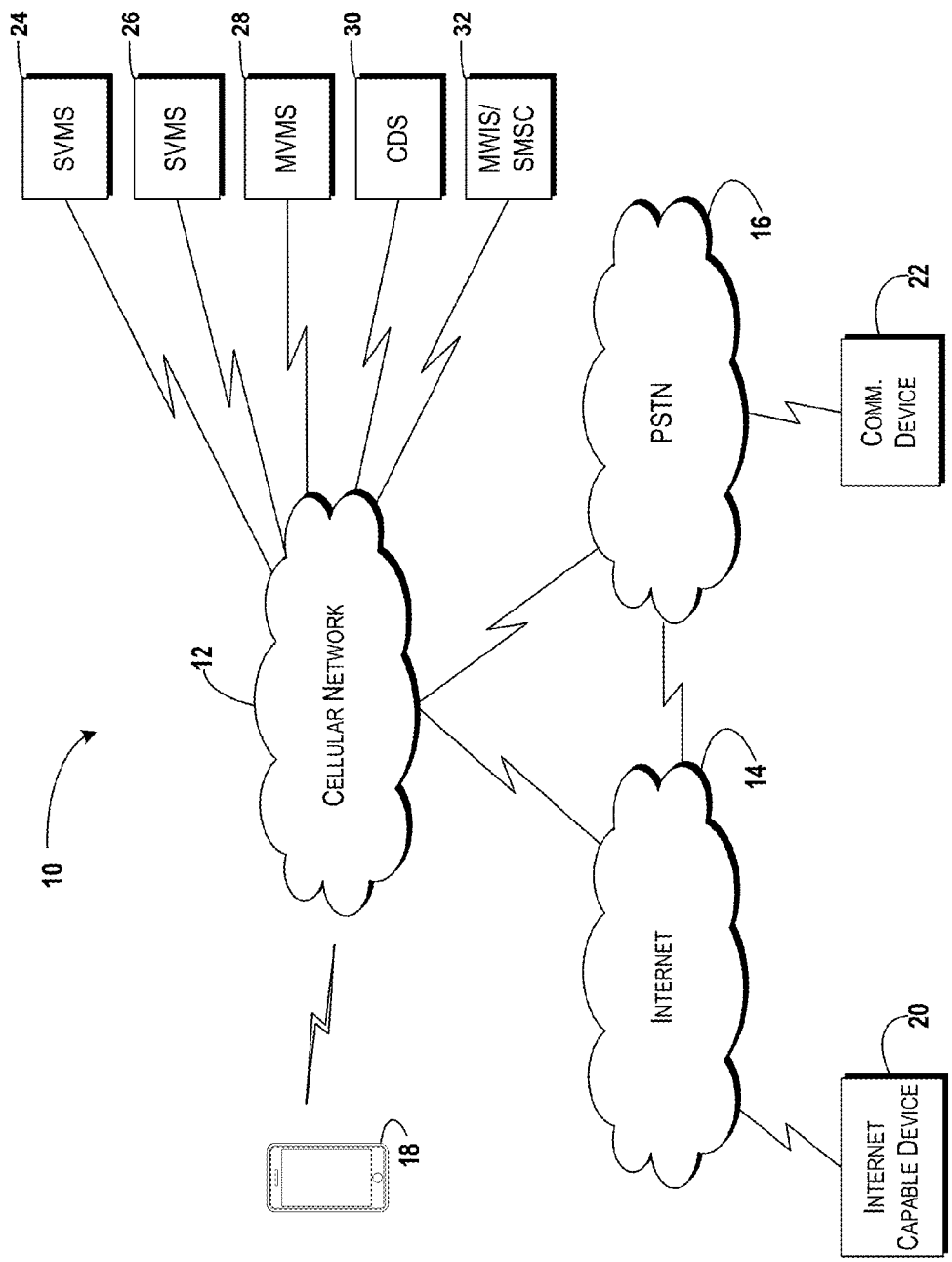
FIG. 1 schematically illustrates an exemplary communications network with which embodiments of the present disclosure can be implemented.

Referring now to the drawings in which like numerals represent like elements throughout the several views, FIG. 1 schematically illustrates an exemplary communications network 10. The illustrated communications network 10 includes a cellular network 12, the Internet 14, and a public switched telephone network (PSTN) 16. The cellular network 12 can include various components such as, but not limited to, base transceiver stations (BTSs), base station controllers (BSCs), mobile switching centers (MSCs), short message service centers (SMSCs), multimedia messaging service centers (MMSCs), home location registers (HLRs), charging platforms, billing platforms, traditional or plain old voicemail platforms (POVMS), visual voicemail platforms (VVMS), GPRS core network components, and the like. A mobile device 18, such as, for example, a cellular telephone, a user equipment, a mobile terminal, a PDA, a handheld computer, a laptop computer, or a combination thereof, can be operatively linked and in communication with the cellular network 12. While the illustrated mobile device 18 resembles an Apple® iPhone™, which are operated in the U.S. solely on AT&T Mobility's cellular network, it should be understood that any device and/or network can be used with embodiments of the present disclosure.

The cellular network 12 can be configured as a 2G GSM (Global System for Mobile communications) network and provide data communications via GPRS (General Packet Radio Service), and EDGE (Enhanced Data rates for GSM Evolution). Additionally, the cellular network 12 can be configured as a 3G UMTS (Universal Mobile Telecommunications System) network and can provide data communications via the HSPA (High-Speed Packet Access) protocol family, for example, HSDPA (High-Speed Downlink Packet Access), EUL (Enhanced Uplink) or otherwise termed HSUPA (High-Speed Uplink Packet Access), and HSPA+ (Evolved HSPA). The cellular network 12 is also compatible with future mobile communications standards including, but not limited to, pre-4G and 4G technologies, for example.

The illustrated cellular network 12 is shown as being in communication with the Internet 14 and a PSTN 16, though it will be appreciated that this is not necessarily the case. The cellular network 12 can include a wide array of nodes, devices, systems, subsystems, networks, subnetworks, software, hardware, servers, applications, and the like. For example, a cellular network 12 can include one or more messaging systems or nodes, for example, SMSCs, MMSCs, voicemail systems, content delivery servers, and the like. A cellular network 12 can also include various radios and nodes for passing voice, data, and combinations thereof to and from radio transceivers, networks, and the Internet 14.

One or more Internet-capable devices 20, for example, a PC, a laptop, a portable device, an Internet-capable cellular telephone, a smart phone, or any other suitable device, can communicate with one or more cellular networks 12, or even a device 18 connected thereto, through the Internet 14. It will also be appreciated that the internet device 20 can communicate with the Internet 14, through the PSTN 16, the cellular network 12, or a combination thereof. As illustrated, a communications device 22, for example, a telephone, facsimile machine, modem, computer, or the like, can be in communication with the PSTN 16, and therethrough to the Internet 14 and/or the cellular network 12. It will be appreciated that the communications device 22 can be an Internet-capable device, and can be substantially similar to the Internet-capable device 20.

The illustrated communications network 10 includes two slave voicemail systems 24, 26 (SVMSs), a master voicemail system 28 (MVMS), though additional voicemail systems are possible. The communications network 10 also includes a content delivery server 30 (CDS) for delivering messages and message content to mobile devices 18, and a message waiting icon server 32 (MWIS). The MWIS 32 can be or can include one or more SMSCs.

It should be understood that the illustrated voicemail systems 24, 26, 28 can be hardware, software, and/or a combination thereof, and can include POVMSs as well as VVMSs, and that the voicemail systems 24, 26, 28 can be associated with any telephone number, web address, account, and the like. For example, the SVMS 24 can be a voicemail system of a regional Bell Operating Company (RBOC) or a VoIP Service Provider. The voicemail systems 24, 26, 28 can also store voicemail messages as audio, video, text, and combinations thereof. As such, the voicemail systems 24, 26, 28 can include hardware and/or software, for example, conversion applications, forwarding applications, translation applications, speech to text applications, text to speech applications, video format conversion applications, audio format conversion applications, and the like.

For purposes of illustration, and not limitation, the SVMS 24 will be described as a voicemail system for a telephone line associated with an exemplary user's home. The SVMS 26 will be described as a voicemail system for a telephone line associated with the exemplary user's work. For example, a voicemail system associated with a private branch exchange (PBX). The MVMS 28 will be described as a VVMS associated with the exemplary user's mobile telephone service. In addition to functioning as the user's mobile telephone voicemail system, the MVMS 28 is configured to centralize and/or consolidate voicemail message storage, retrieval, delivery, and/or combinations thereof. In some embodiments, the SVMSs 24, 26 are configured to forward incoming calls for the respective telephone lines to the MVMS 28. In other embodiments, the SVMSs 24, 26 are configured to forward messages deposited at the SVMSs 24, 26 to the MVMS 28. In still other embodiments, the MVMS 28 is configured to download messages deposited at the SVMSs 24, 26 and store the messages at the MVMS 28. In any or all of these embodiments, various data relating to the calls and/or messages can be used by the MVMS 28 to determine, among other things, the telephone line with which the call and/or message is associated. These and other exemplary embodiments will be described in more detail below.

While the VMSs 24, 26, 28, the CDS 30, and the MWIS 32, are illustrated as being connected to the cellular network 12, it should be appreciated that the VMS 24, 26, 28, the CDS 30, and the MWIS 32, can each be hardware and/or software residing on one or more of the cellular network 12, the PSTN 16, the mobile device 18, the Internet 14, and that the VMSs 24, 26, 28, the CDS 30, and the MWIS 32, can be accessible by and/or through multiple devices and networks, including, but not limited to, private networks, which are not illustrated in FIG. 1. It should be appreciated that substantially all of the functionality described with reference to the communications network 10 can be performed by the cellular network 12.

Figure 2:
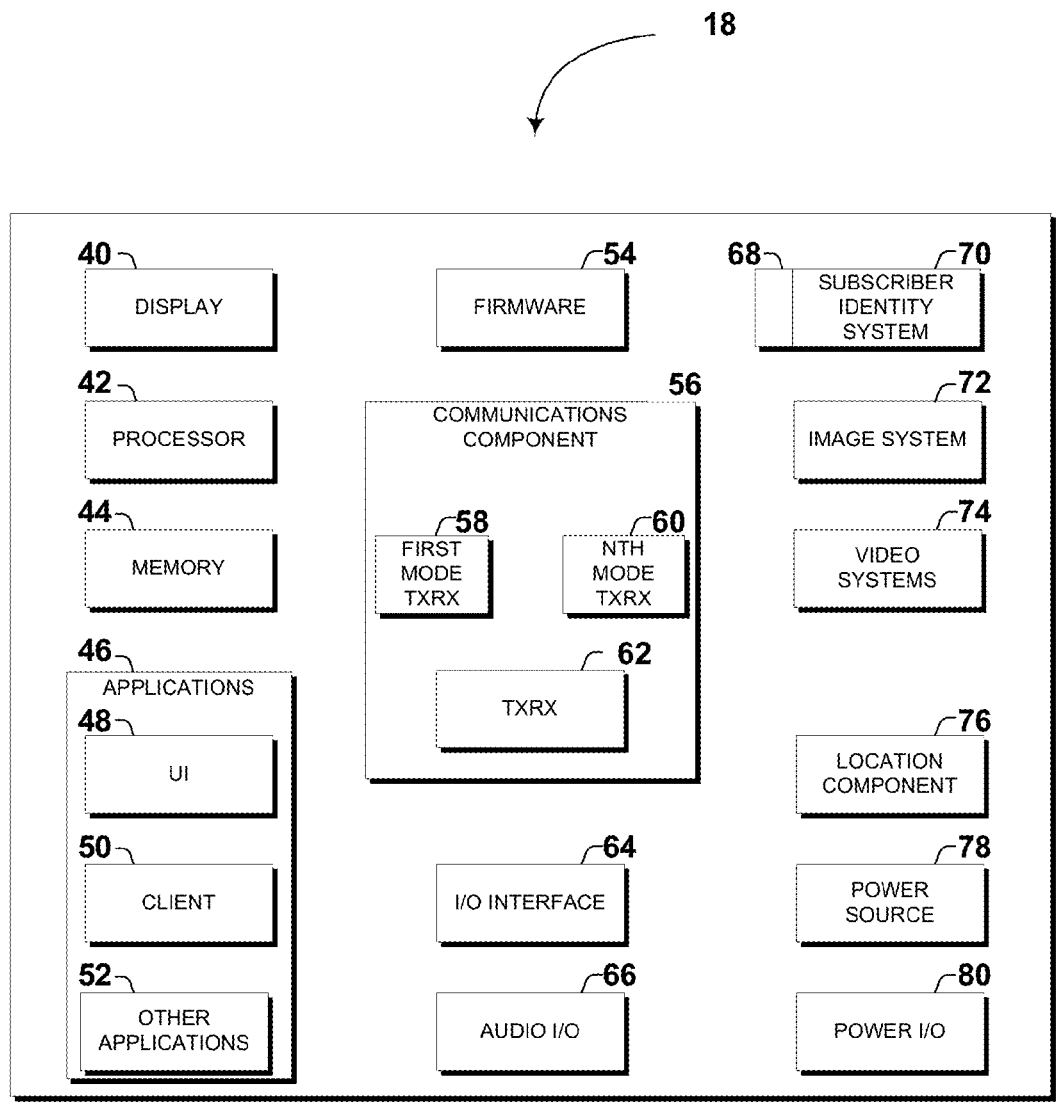
FIG. 2 schematically illustrates a block diagram of an exemplary mobile device for use with some exemplary embodiments of the present disclosure.

FIG. 2 illustrates a schematic block diagram of an exemplary mobile communications device 18 for use in accordance with an exemplary embodiment of the present disclosure. Although no connections are shown between the components illustrated in FIG. 2, the components can interact with each other to carry out device functions. It should be understood that FIG. 2 and the following description are intended to provide a brief, general description of a suitable environment in which the various aspects of an embodiment of the present disclosure can be implemented. While the description includes a general context of computer-executable instructions, the present disclosure can also be implemented in combination with other program modules and/or as a combination of hardware and software. The term "application," or variants thereof, is used expansively herein to include routines, program modules, programs, components, data structures, and the like. Applications can be implemented on various system configurations, including single-processor or multiprocessor systems, minicomputers, mainframe computers, personal computers, hand-held computing devices, microprocessor-based, programmable consumer electronics, combinations thereof, and the like.

As illustrated, the mobile communications device 18 can be a multimode handset. The device 18 can include a variety of computer readable media, including volatile media, non-volatile media, removable media, and non-removable media. Computer-readable media can include device storage media and communication media. Storage media can include volatile and/or non-volatile, removable and/or non-removable media such as, for example, RAM, ROM, EEPROM, flash memory or other memory technology, CD ROM, DVD, or other optical disk storage, magnetic tape, magnetic disk storage or other magnetic storage devices, or any other medium that can be used to store the desired information and that can be accessed by the device 18.

The device 18 can include a display 40 for displaying multimedia such as, for example, text, images, visual voice-mail, video, telephony functions such as Caller ID data, setup functions, menus, music, metadata, messages, wallpaper, graphics, internet content, device status, preferences settings, map data, location data, and the like. The device 18 can include a processor 42 for controlling, and/or processing data. A memory 44 can interface with the processor 42 for the storage of data and/or applications 46. An application 46 can include, for example, video playback software, voicemail software, conversion software, archival software, forwarding software, audio playback software, music player software, email software, translation software, speech to text software, text to speech software, messaging software, combinations thereof, and the like. The application 46 can also include a user interface (UI) application 48. The UI application 48 can interface with a client 50 (e.g., an operating system) to facilitate user interaction with device functionality and data, for example, answering/initiating calls, entering/deleting data, configuring settings, address book manipulation, multimode interaction, and the like. The applications 46 can include other applications 52 such as, for example, firmware, visual voicemail software, add-ons, plug-ins, voice recognition, call voice processing, voice recording, messaging, e-mail processing, video processing, image processing, voicemail file archival, converting, and forwarding, music play, combinations thereof, and the like, as well as subsystems and/or components. The applications 46 can be stored in the memory 44 and/or in a firmware 54, and can be executed by the processor 42. The firmware 54 can also store code for execution during initialization of the device 18.

A communications component 56 can interface with the processor 42 to facilitate wired/wireless communications with external systems including, for example, cellular networks, VoIP networks, LAN, WAN, MAN, PAN, that can be implemented using Wi-Fi, Wi-Max, combinations and/or improvements thereof, and the like. The communications component 56 can also include a multimode communications subsystem for providing cellular communications via different cellular technologies. For example, a first cellular transceiver 58 can operate in one mode, for example, GSM, and an Nth transceiver 60 can operate in a different mode, for example UMTS. While only two transceivers 58, 60 are illustrated, it should be appreciated that a plurality of transceivers can be included. The communications component 56 can also include a transceiver 62 for unlicensed communications using technology such as, for example, WI-FI, WI-MAX, BLUETOOTH, infrared, IRDA, NFC, RF, and the like. The communications component 56 can also facilitate communications reception from terrestrial radio networks, digital satellite radio networks, Internet-based radio services networks, combinations thereof, and the like. The communications component 56 can process data from a network such as, for example, the Internet, a corporate intranet, a home broadband network, and the like, via an ISP, DSL provider, or broadband provider.

An input/output (I/O) interface 64 can be provided for input/output of data and/or signals. The I/O interface 64 can be a hardwire connection, such as, for example, a USB, mini-USB, audio jack, PS2, IEEE 1394, serial, parallel, Ethernet (RJ48), RJ11, and the like, and can accept other I/O devices such as, for example, a keyboard, keypad, mouse, interface tether, stylus pen, printer, thumb drive, touch screen, touch pad, trackball, joy stick, microphones, remote control devices, monitor, display, LCD, combinations thereof, and the like. It will be appreciated that the I/O interface 64 can be used for communications between the device and a network or local device, instead of, or in addition to, the communications component 56.

Audio capabilities can be provided by an audio I/O component 66 that can include a speaker for the output of audio signals and a microphone to collect audio signals. The device 18 can include a slot interface 68 for accommodating a subscriber identity system 70 such as, for example, a SIM or universal SIM (USIM). The subscriber identity system 70 instead can be manufactured into the device 18, thereby obviating the need for a slot interface 68. The device 18 can include an image capture and processing system 72. Photos and/or videos can be obtained via an associated image capture subsystem of the image system 72, for example, a camera. The device 18 can also include a video system 74 for processing, recording, and/or transmitting video content.

A location component 76, can be included to send and/or receive signals such as, for example, GPS data, triangulation data, combinations thereof, and the like. The device 18 can use the received data to identify its location or can transmit data used by other devices to determine the device 18 location. The device 18 can include a power source 78 such as batteries and/or other power subsystem (AC or DC). The power source 78 can interface with an external power system or charging equipment via a power I/O component 80.

Figure 3:
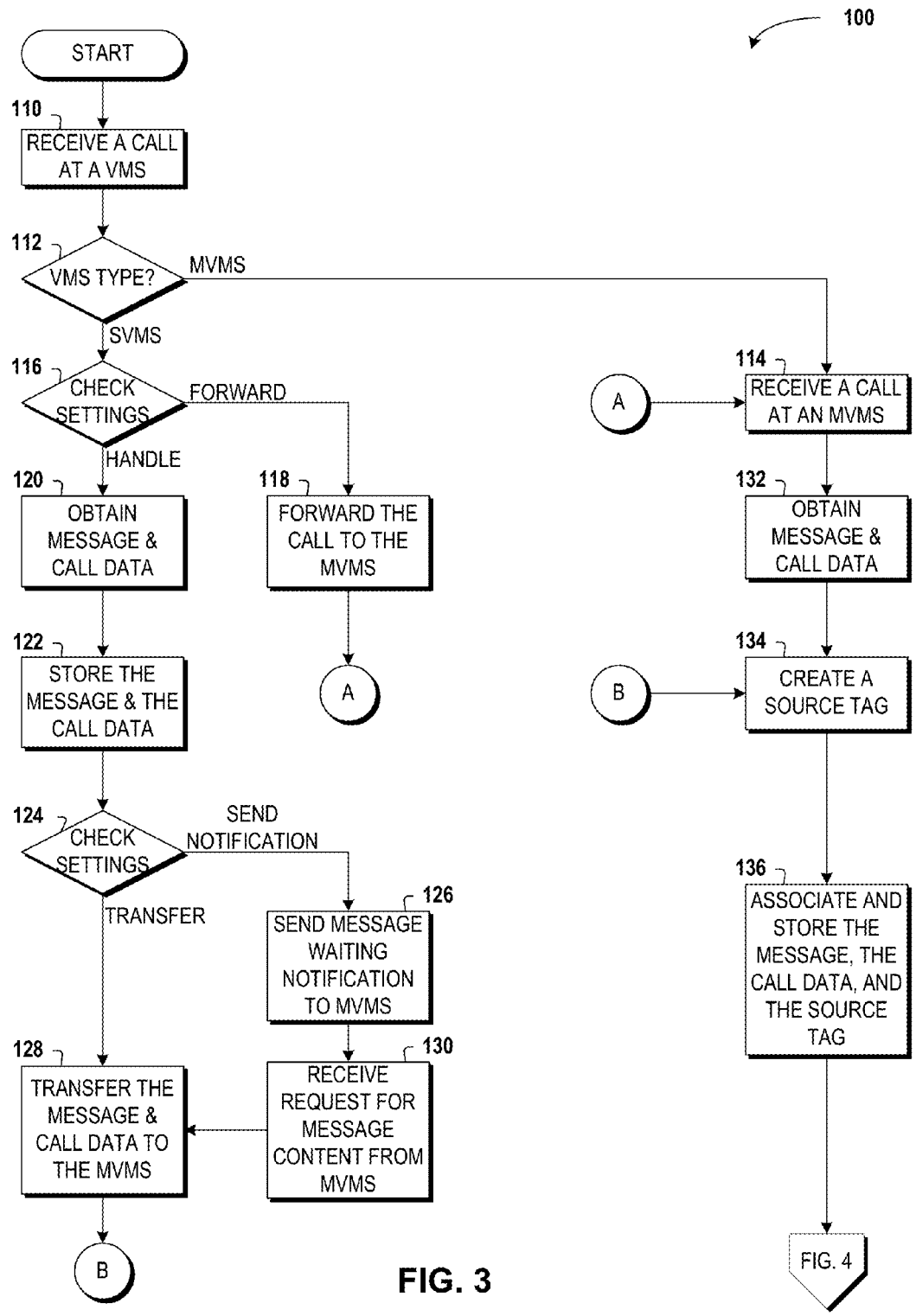
FIG. 3 schematically illustrates a method for depositing voicemail messages to a master voicemail system, according to several exemplary embodiments of the present disclosure.
Figure 4:
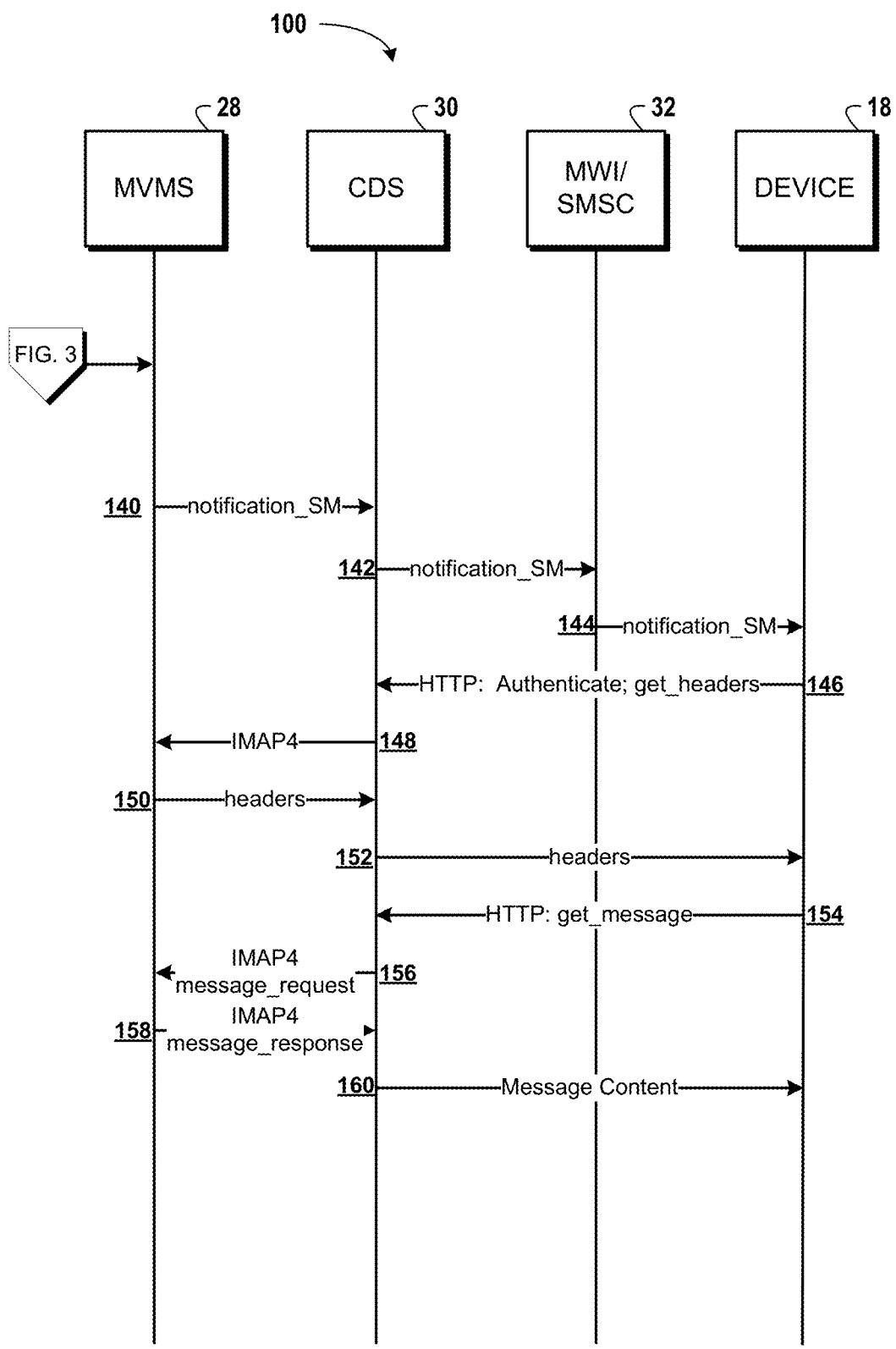
FIG. 4 is a call flow diagram illustrating an exemplary method for downloading one or more voicemails deposited at voicemail systems to a device, according to an exemplary embodiment of the present disclosure.

FIGS. 3 and 4 schematically illustrate an exemplary method 100 for voicemail message deposit and subsequent retrieval of message content for local storage on a mobile device, according to some exemplary embodiments of the present disclosure. It should be understood that the steps described are not necessarily presented in any particular order and that performance of some or all of the steps in an alternative order(s) is possible and is contemplated. The steps have been presented in the demonstrated order for ease of description and illustration. Steps can be added, omitted and/or performed simultaneously without departing from the scope of the appended claims. The method 100 can be terminated at any time. Some or all steps of this process, and/or substantially equivalent steps, can be performed by execution of computer-readable instructions included on a computer readable medium.

In an attempt to simplify the description of the method 100, some steps, network elements, and nodes have been omitted from FIGS. 3 and 4. Similarly, messages and data are described and illustrated in generic terms, though it will be appreciated that multiple message and data formats, as well as multiple message and data nodes, relays, and messaging platforms can be involved in any or all of the communications described herein.

In an additional attempt to simplify the description and to avoid complicating the disclosure, the following description will describe, in general terms, performance of various systems and methods embodying some concepts of various embodiments of the disclosure. In reading the description of the several embodiments disclosed herein, it should be understood that a user can interact with a voicemail system, for example, the voicemail systems 24, 26, and 28, using a telephone user interface (TUI), a GUI, a web UI, or another UI. Alternatively, a user can interact with the device 18, and the device 18 can handle all communication needed to instruct the MVMS 28 how to carry out the user's desired actions. Therefore, DMTF-driven TUIs, icon-based GUIs, touch-sensitive screen GUIs, web UIs, voice-driven TUIs, and the like are included in the following descriptions of the exemplary method 100 disclosed herein and are included in the scope of the appended claims.

As illustrated in FIG. 3, the exemplary method 100 can begin and can proceed to block 110, wherein a call is received at a voicemail system, for example, an SVMS 24, 26, or an MVMS 28. As will be explained in more detail below, a call can be received directly at the voicemail system, or can be forwarded to the voicemail system from another voicemail system. It should be appreciated that the word "forward," as used in this description and in the claims includes multiple contemplated methods of transferring and/or consolidating calls and/or voicemail messages at an MVMS 28. For example, one embodiment includes forwarding incoming calls from an SVMS 24, 26 to an MVMS 28, and storage of message content and call data by the MVMS 28. In another embodiment, the SVMS 24, 26 obtains and stores voicemail messages and transfers to the MVMS 28 message content and call data. In another embodiment, the SVMS 24, 26 obtains and stores message content and call data and forwards to the MVMS 28 a notification that indicates to the MVMS 28 that messages are waiting. The MVMS 28 can connect to the SVMS 24, 26 and download message content and call data. These and other embodiments are included within the scope of the appended claims.

As shown at block 112, the method 100 can proceed in at least two different ways. If the voicemail system is an MVMS 28, the method 100 can proceed to block 114, which will be described in more detail below. If the voicemail system is an SVMS 24, 26, the method 100 can proceed to block 116, wherein the SVMS 24, 26 can check the settings to determine how to handle the incoming call. If the SVMS 24, 26 is configured to forward incoming calls to an MVMS 28, the method 100 can proceed to block 118, whereat the SVMS 24, 26 can forward the incoming call to the MVMS 28. If the SVMS 24, 26 is configured to handle the call, then the method 100 can proceed to block 120, whereat the SVMS 24, 26 can obtain a message and call data associated with the incoming call. Although not illustrated, obtaining a message can include playing a greeting, prompting a calling party for a message, recording an audio, video, or text message, converting the message to a desired format, translating a message or a portion thereof, converting speech to text, and/or other functions. As illustrated at block 122, the SVMS 24, 26 can store the message(s) and associated call data in a memory (not illustrated).

The method 100 can proceed to decision block 124, whereat the SVMS 24, 26 can check the settings to determine how to consolidate messages at the MVMS 28. If the SVMS 24, 26 is configured to send a notification to the MVMS 28, then the method 100 can proceed to block 126, whereat the SVMS 24, 26 can send a message waiting notification to the MVMS 28. It will be appreciated that the SVMS 24, 26 can direct other network nodes to send one or more notifications to the MVMS 28 in one or more formats. Exemplary formats include short message peer-to-peer (SMPP), domain name server (DNS) protocol, lightweight directory access protocol (LDAP), unstructured supplementary service data (USSD) protocol, Internet message access protocol version 4 (IMAP4), and hypertext transfer protocol (HTTP), HTTP over secure sockets layer (HTTPS), other message formats, and the like. These formats and nodes will not be discussed here in detail for the sake of brevity.

The SVMS 24, 26 can receive, from the MVMS 28, a request for message content and/or call data, as shown at block 130. At block 128, the SVMS 24, 26 can transfer, or direct other network nodes to transfer, the message content and/or call data to the MVMS 28. The message content and call data can be transferred to the MVMS 28 using a data session, a voice session, or both. The method 100 can then proceed to block 134 as shown by the on-page reference B. It should be understood that in addition to, or instead of, sending a request to the SVMS 24, 26 for message content and/or call data, the MVMS 28 can connect to the SVMS 24, 26 to retrieve message content and/or call data. Returning briefly now to decision block 124, if the SVMS 24, 26 is configured to transfer message content and call data to the MVMS 28, the method 100 can proceed to block 128. The message content and/or call data can be transferred to the MVMS 28 using a data session, a voice session, or both. The method 100 can then proceed to block 134 as shown by the on-page reference B.

As discussed above, the method 100 can proceed to block 114 from block 112, or from block 118. At block 114, the MVMS 28 receives an incoming call. As illustrated at block 132, the MVMS 28 can obtain a message and call data from the incoming call. As explained briefly above, obtaining a message can include playing a greeting, prompting a calling party for a message, recording an audio, video, or text message, converting a message, translating a message, and/or other functions. The method 100 can proceed to block 134 from block 132 or from block 128. At block 134, the MVMS 28 can create a source tag for the message content and call data. For purposes of the description and the appended claims, the term "source tag" includes data that indicates the source of message content and call data. The source tag can be appended to a message, made a part of the message, associated with a message, inserted into the message headers, combinations thereof, and the like. The source tag can be used to indicate the source of a message. For example, if the incoming call was originally received at an SVMS 24 associated with a user's work telephone line, the source tag can indicate that the message content and call data is associated with the work telephone line. The source tag can be interpreted by the MVMS 28, the device 18, or other network element or device connected thereto, to denote that the message is from a work voicemail system. The use of source tags can allow multiple voicemail systems to consolidate messages at a centralized voicemail system, while allowing a user or device to associate messages with a consolidated voicemail system. As illustrated at block 136, the MVMS 28 can associate a source tag with a message and store the message, the call data, and the source tag in a memory as a message. The method 100 can proceed to FIG. 4.

FIG. 4 schematically illustrates additional methodology of the exemplary method 100 for voicemail message deposit and subsequent retrieval of message content for local storage on a mobile device. As explained above with reference to FIG. 3, it should be understood that the steps illustrated and described in FIG. 4 are not necessarily presented in any particular order and that performance of some or all of the steps in an alternative order(s) is possible and is contemplated. The steps have been presented in the demonstrated order for ease of description and illustration. Steps can be added, omitted and/or performed simultaneously without departing from the scope of the appended claims. Some or all steps of this process, and/or substantially equivalent steps, can be performed by execution of computer-readable instructions included on a computer readable medium.

The illustrated method 100 begins with a message being deposited at the MVMS 28 as illustrated and described above with reference to FIG. 3. Messages can be deposited at the MVMS 28 directly, or indirectly, as explained above with reference to FIG. 2. In the illustrated embodiment, the MVMS 28 notifies the CDS 30, for example, by generating a SMPP notification message (notification_SM) that is sent to the CDS 30, as shown at step 140. A notification_SM message can include, but is not limited to, the hostname and port number for the subscriber's CDS 30, a token identifying the subscriber's MVMS 28, the subscriber's voicemail box ID embedded with a token to uniquely identify the subscriber for the MVMS 28, and the current VMS password. In some alternative embodiments, the notification_SM includes an IP address and port number for the subscriber's CDS 30 and a mailbox_ID. The password and token can be added to help increase security and to help preserve data integrity. If a password is used, the password can be encrypted or unencrypted, and/or the password can be obscured to hide the actual default password digits.

The CDS 30 can forward the notification_SM message, at step 142, to the SMSC 32 that, in turn, can forward the message, at step 144, to the device 18. The device 18 receives the notification_SM message and generates an HTTP get_headers command/message that is sent to the CDS 30, at step 146. The get_headers message can include parameters such as the date, time, and calling line identity (CLI). The get_headers message can additionally include authentication information for IMAP sessions between the CDS 30 and MVMS 28. At step 148, the CDS 30 initiates an IMAP session with the MVMS 28. Accordingly, a TCP connection is established and the get_headers message is used to authenticate the session, after which the subscriber's voicemail box is accessed on the MVMS 28 to retrieve the header information for the voicemail messages. The MVMS 28 sends the headers to the CDS 30, at step 150. The CDS 30 forwards the headers to the device 18, at step 152. The device 18 uses the headers to determine the status of each message stored on the device 18 and identify any deposited messages or changes to messages. After the device 18 determines which message(s) needs to be retrieved, the device 18 generates and sends a message request, for example, an HTTP get_message request with the header information for the requested message(s), at step 154. At step 156, this message is received and the CDS 30 generates and sends an IMAP message_request, including the requested voicemail message header information, to the MVMS 28. The MVMS 28 processes the request and returns the requested message content in an IMAP message_response, at step 158. The CDS 30 then delivers the designated message content to the device 18, at step 160. Upon receipt of the message content, the device 18 stores the content under the appropriate header in a memory and permits the subscriber to access the content via a user interface, for example, a GUI. The message content can be formatted using any audio CODEC, such as, but not limited to, adaptive multi-rate (AMR), AMR wideband (AMR-WB), or any other standardized or independent audio CODEC, including, but not limited to waveform audio (WAV), audio interchange file format (AIFF), RAW, encoded in GSM CODEC, advanced audio coding (AAC), MPEG-1 audio layer 3 (MP3), MPEG-4 Part 14 (MP4 or M4A), Windows® media audio (WMA), RealAudio (RA), free lossless audio codec (FLAC), Apple® lossless encoder (ALE), i.e., Apple® lossless audio codec (ALAC), and other open and proprietary audio formats.

In certain embodiments, an "if-modified-since" HTTP Message can be used to occasionally poll the MVMS 28 for the Inbox voicemail message list and update any voicemail message "if-modified-since" the last update, for example, if a message was deleted or added at the device 18 or the MVMS 28. This can help reduce the amount of data traversing the network, thereby reducing network congestion. However, in some embodiments the header information is relatively small and as such no noticeable improvement may be available for sending only the modified voicemail message header.

In certain embodiments, more than one connection can be established to the MVMS 28 or in some cases to multiple or redundant VMSs. This can allow simultaneous requests in order to serve a subscriber's request to view or listen to a message faster. In some other embodiments, messages are transferred to a device 18 upon receipt by the MVMS 28. Load balancing techniques can also be implemented. In certain embodiments, message downloads that are interrupted, for example, via cancellation or connection failure, can be resumed starting at the last received byte. These embodiments assume the message is stored in full, at least temporarily, on the CDS 30. However, in some embodiments, the CDS 30 deletes the message after the message content is sent to the device 18. A subsequent request for one or more previously sent messages is facilitated by re-retrieving the message, re-transcoding the message, and sending the message to the device 18. In certain embodiments, requests to the CDS 30 can be pipelined in accordance with HTTP 1.1 specifications. This can help reduce network latency for multiple requests.

Figure 5:
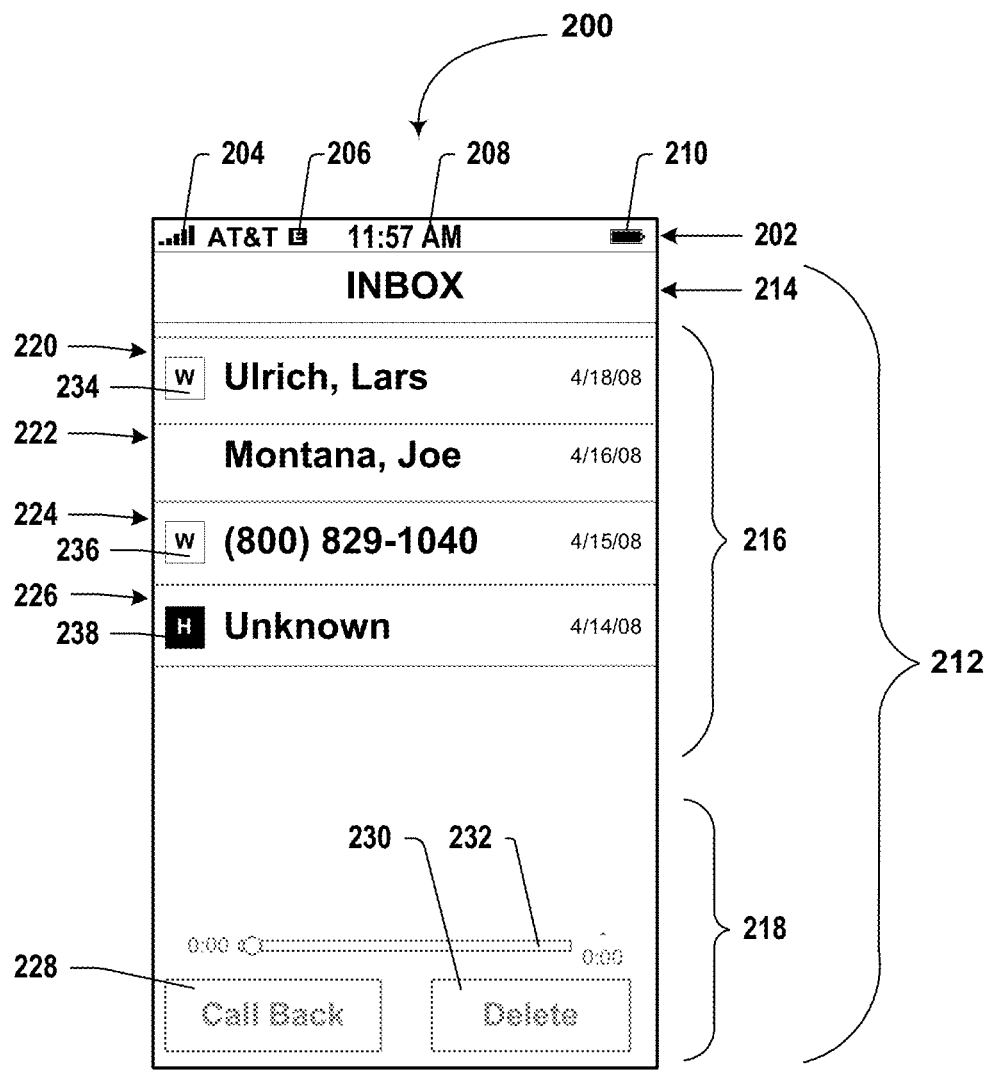
FIG. 5 illustrates an exemplary graphical user interface (GUI) for a visual voicemail client, according to an exemplary embodiment of the present disclosure.

FIG. 5 illustrates an exemplary representative image from a GUI 200 for a device 18, according to an exemplary embodiment of the disclosure. As has been explained above, the voicemail systems 24, 26, 28 can be configured and/or controlled with a variety of UIs, including, but not limited to, a GUI 200 on a device 18. As such, the GUI 200 illustrated in FIGS. 5-8 is a general illustration of one embodiment of a UI, illustrated solely for the purpose of explaining how a user can tailor and/or control the one or more voicemail systems. The illustrated GUI 200 should not be understood as a limiting embodiment. It must therefore be understood that various menu options, settings, passwords, and the like, can be controlled and/or tailored by interfacing with one or more VMSs through a TUI, a GUI, a Web UI, a network operator, and the like. In the illustrated embodiment, an exemplary visual voicemail client UI is used to control the voicemail consolidation menus and functions.

As illustrated, the GUI 200 can include operational information 202 for the device 18. The operational information 202 can include network information, for example, a signal meter 204 for displaying the measured strength of a network signal, and a network indicator 206 for displaying the current network to which the device 18 is connected. In the illustrated GUI 200, the device 18 is indicating a maximum signal strength and that the device 18 is currently connected to the AT&T EDGE (Enhanced Data rates for GSM Evolution) network. It should be understood that this indication is exemplary only since the GUI 200 can be used on devices operating on other networks and operated by other carriers. The operational information 202 can also include, for example, the time of day 208, a battery meter 210, as well as other indicators, including, but not limited to, a short range radio communications device indicator, an alarm indicator, a date, and the like.

In the illustrated GUI 200, an exemplary visual voicemail application user interface (VVMAUI) 212 is currently displayed. The illustrated VVMAUI 212 includes a title and/or menu portion 214, a mailbox contents portion 216, and a control portion 218. The mailbox contents portion 216 can display one or more messages 220, 222, 224, 226. The control portion 218 can include one or more controls, if desired. The illustrated control portion 218 includes a callback option 228, a delete option 230, and a time slider bar 232. Additional options, menus, functions, and the like can be displayed, but are not illustrated in FIG. 5.

In some embodiments, the GUI 200 is controlled by using buttons, soft-buttons, joysticks, switches, wheels, or the like on a device keypad. In other embodiments, the voicemail client is run using an input/output device operatively connected to the device 18. In other embodiments, the GUI 200 also functions as a touch-sensitive input device for accepting user input, whereby a user can touch the screen at a desired option to enter a command corresponding to the selected option. In still other embodiments, a combination of input devices are used to make desired selections. These and other embodiments are included in the scope of the appended claims.

As illustrated, some or all of the messages 220, 222, 224, 226 can include an indication 234, 236, 238 as to the voicemail system at which the message was left, or was intended to be left. The indicators 234, 236, 238 can be generated by a network element, a VMS 24, 26, 28, or the device 18, and can be based at least partially upon source tags or header data included with, associated with, and/or embedded in the message data. In the illustrated exemplary embodiment, the indicators 234, 236, 238 are icons. The messages 220 and 224 include "W" icons 234 and 236, indicating that the calls from which messages 220 and 224 were saved were directed to the user's work telephone line. The message 226 includes an "H" icon 238, indicating that the call from which the message 226 was saved was directed to the user's home telephone line. The message 222 includes no icon. In the illustrated embodiment, the absence of an icon next to the message 222 indicates that the message 222 was directed to the telephone line associated with the MVMS 28. It will be appreciated that an icon or other indicator could be included for any, all, or no messages.

It should be understood that the indicators 234, 236, 238 are exemplary only and that other types of indicators are contemplated and included in the scope of the specification and the appended claims. For example, in some embodiments, the inbox includes folders for some or all of the associated voicemail system. Messages associated with the voicemail systems can be stored in respective folders, thereby indicating the source of the messages in the respective folders. In other embodiments, each message is color coded according to the source voicemail system. For example, home voicemails could be a first color, work voicemails could be a second color, and mobile voicemails could be a third color. Similarly, source can be indicated by, for example, font, color, picture, text, video, animations, audio, font size, combinations thereof, and the like. Other visual or audio indicators are contemplated, but will not be set forth in detail for the sake of brevity.

It should also be understood that the exemplary GUI 200 could include other information relating to the messages, message content, call data, the associated voicemail system, and the like. For example, the GUI 200 could display message size, message type, message length, priority codes, and the like. Some additional indicators are discussed below with reference to FIG. 8.

Figure 6:
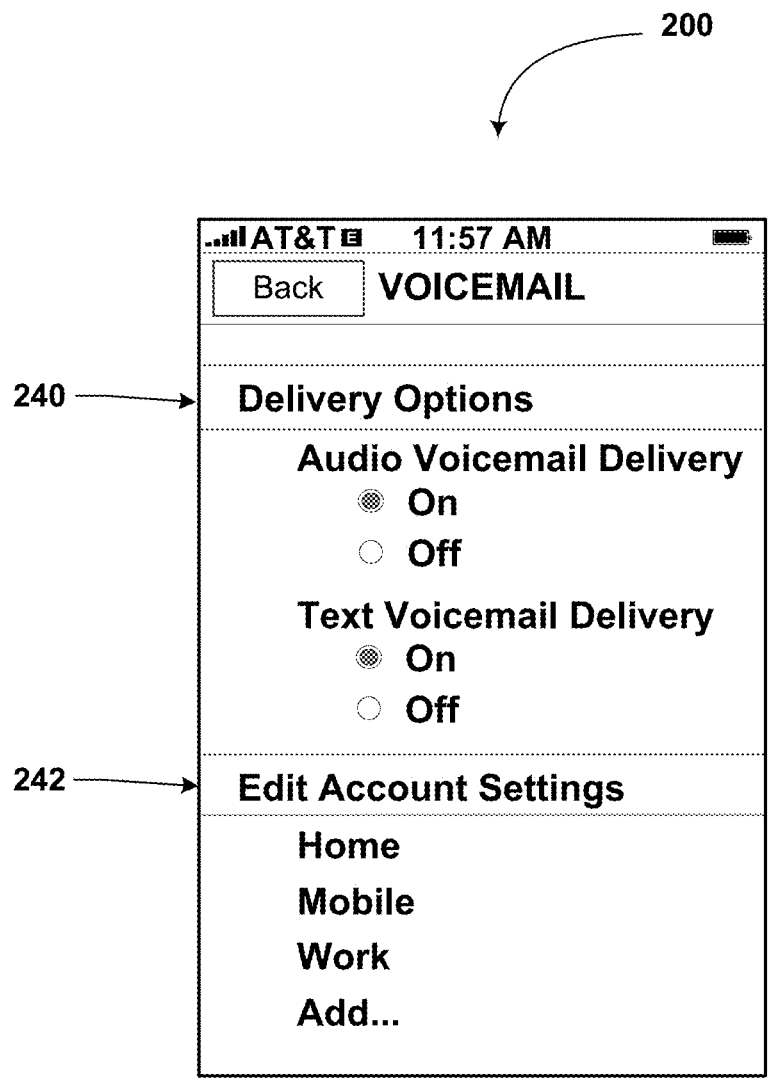
FIG. 6 illustrates an exemplary GUI for configuring voicemail consolidation settings for a visual voicemail client, according to an exemplary embodiment of the present disclosure.

FIG. 6 illustrates another exemplary representative image from a GUI 200 for a device 18, according to an exemplary embodiment of the disclosure. In FIG. 6, the user has entered a settings menu for a visual voicemail client. It should be stressed that the illustrated GUI 200, the options represented therein, the text of the options, and the controls presented, are exemplary only, and represent only one contemplated exemplary embodiment. The illustrated menu includes a submenu 240 for setting message format delivery options. In the illustrated submenu 240, the user has the option to toggle on or off delivery of audio voicemails and text voicemails. Text voicemails can be left by calling parties, or generated by a speech to text application from audio or video messages. Additionally or alternatively, text voicemails can be generated by translation software from text, video, or audio messages. As such, the illustrated menu can include options relating to translation, for example, enabling translation, setting default languages, and the like. As illustrated in FIG. 6, any, none, or all of the delivery formats can be turned on or off.

The illustrated menu also includes a submenu 242 for managing accounts and account settings associated with the voicemail systems. In the illustrated menu, a home, mobile, and work account are shown, as is an option to add an additional account. Any number of accounts can be consolidated using embodiments of the present disclosure, and hence any number of accounts can be listed in the edit accounts list or submenu 242. The illustrated submenu 242 also includes an option to add an account.

Figure 7:
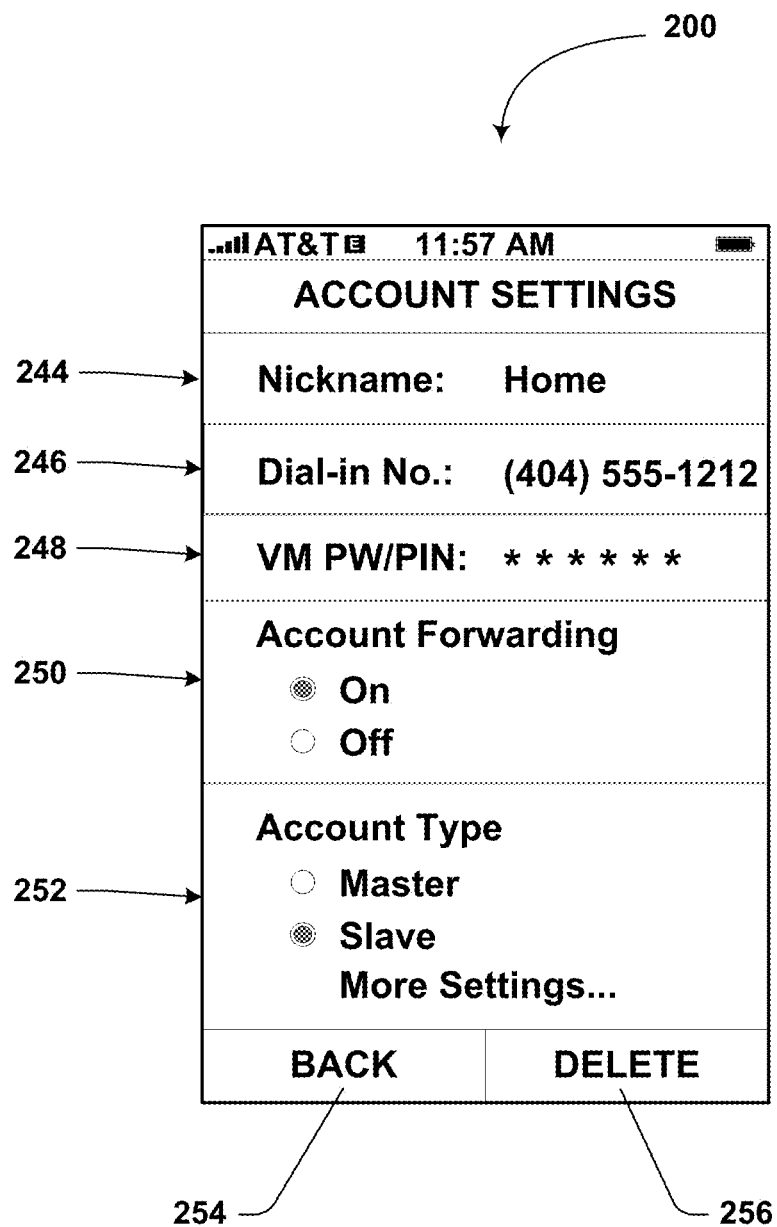
FIG. 7 illustrates another exemplary GUI for configuring voicemail consolidation settings for a visual voicemail client, according to an exemplary embodiment of the present disclosure.

FIG. 7 illustrates another exemplary representative image from a GUI 200 for a device 18, according to an exemplary embodiment of the disclosure. The GUI 200 is displaying an exemplary menu for editing the home voicemail account, for example, if the user selects the home account under the edit account settings submenu 242.

The illustrated GUI 200 includes an option 244 to set a nickname for the selected account, allowing a user to associate a recognizable word or phrase with an account. In the illustrated example, the user has entered the word "Home" as the nickname. The illustrated GUI 200 also includes an option 246 for entering a dial in number for the associated voicemail box. This option 246 may be necessary depending upon how the MVMS 28 retrieves message content transfers from an SVMS 24, 26. The dial-in number can be used by the MVMS 28, for example, for authentication purposes, or for purposes of connecting to an SVMS 24, 26 for downloading messages.

The illustrated GUI 200 also includes an option 248 for entering a password (PW) or personal identification number (PIN). As shown in FIG. 7, the PW or PIN can be obscured by the device 18 to prevent inadvertent disclosure of the PW or PIN to unauthorized parties. The illustrated GUI 200 can also include an option 250 for toggling on or off the forwarding of voicemails and/or telephone calls associated with the account. A user may wish to deactivate the account forwarding option, for example, when the user travels abroad. While abroad, the user may wish to limit roaming data for purposes of avoiding high costs associated with roaming data. By deactivating the account forwarding option, the user can prevent new messages from the account from being forwarded to the device 18, thereby reducing data traffic to/from the device 18.

The illustrated GUI 200 also includes an exemplary menu 252 for setting the account type of the selected account. In the illustrated GUI 200, the user has designated the "Home" voicemail system as a slave account, the significance of which is described above with reference to FIG. 3. The menu 252 also includes an option to adjust additional settings of the voicemail account, for example, the frequency of queries for new messages, the voicemail system to which a voicemail system forwards messages, message time limits, message formats, conversion settings, text, audio, and video settings, translation settings, and the like. Although these and other additional settings are not illustrated in FIG. 7, it should be appreciated that a user can determine how and if the voicemail system interfaces with other voicemail systems designated by the user, including setting some or all of the options described above with reference to FIGS. 3-6.

With particular reference to FIG. 3, and by way of example, and not limitation, the user can set whether the SVMSs 24, 26 handle incoming calls, transfer the calls to an MVMS 28 for handling, and whether the SVMSs 24, 26 store and forward messages to an MVMS 28, or store messages and send notifications to the MVMS 28 of messages waiting. If the voicemail system is an MVMS 28, the user can set which voicemail systems deposit messages to the MVMS 28, and the like. The user can also enter authentication information for some or all voicemail systems, if desired. If the SVMSs 24, 26 store messages, the user can set whether the MVMS 28 connects to the SVMS 24, 26 using a data connection, voice connection, and the like. Additional settings can be included, though not illustrated. It should be understood that some or all of the settings can be set at voicemail systems using a TUI, a web UI, a device GUI, and the like. It should also be understood that some or all voicemail system settings can be set by the network operator or another authorized party. The user may, or may not, be able to customize these and other settings.

The illustrated GUI 200 also includes two exemplary menu options 254, 256. The illustrated menu options are exemplary only. Additional or alternative menu options are possible and contemplated, for example, an option to edit, select, and/or designate an icon selection for a voicemail system. The illustrated back option 254 can be used to navigate to a previous, additional, or parent menu or directory. The delete option 256 can be used to delete the selected account, for example. In the event that the delete option 256 is selected by a user, the account as set up at the device 18 can be deleted. However, it will be appreciated that the account may not be deleted from the telephone system with which the voicemail account is associated.

While the description of FIG. 7 has set forth some of the exemplary options available for customization, the systems and methods for updating voicemail system settings at/with respective telephone networks has not been described in detail. It should be appreciated that selection of certain options at the device 18 may not effect any changes at an associated voicemail system without communication between the device 18 and one or more associated voicemail systems. For example, if a user elects to make a voicemail system a slave voicemail account, the device 18 will need to communicate this selection with one or more voicemail systems. It should be appreciated that a user may need to set these options via a web UI, a TUI, through a network operator, or the like, according to preferences, capabilities, and needs of a network or network operator, for example. It should be appreciated that multiple messaging platforms, protocols, and systems can be used to effect the messaging between and among users, devices 18, voicemail systems 24, 26, 28, and/or communications networks 10. Exemplary formats include, but are not limited to, short message peer-to-peer (SMPP), domain name server (DNS) protocol, lightweight directory access protocol (LDAP), unstructured supplementary service data (USSD) protocol, Internet message access protocol version 4 (IMAP4), and hypertext transfer protocol (HTTP), HTTP over secure sockets layer (HTTPS), other message formats, and the like, many of which have been discussed above with respect to communication between the device 18 and the voicemail systems 24, 26, 28.

Figure 8:
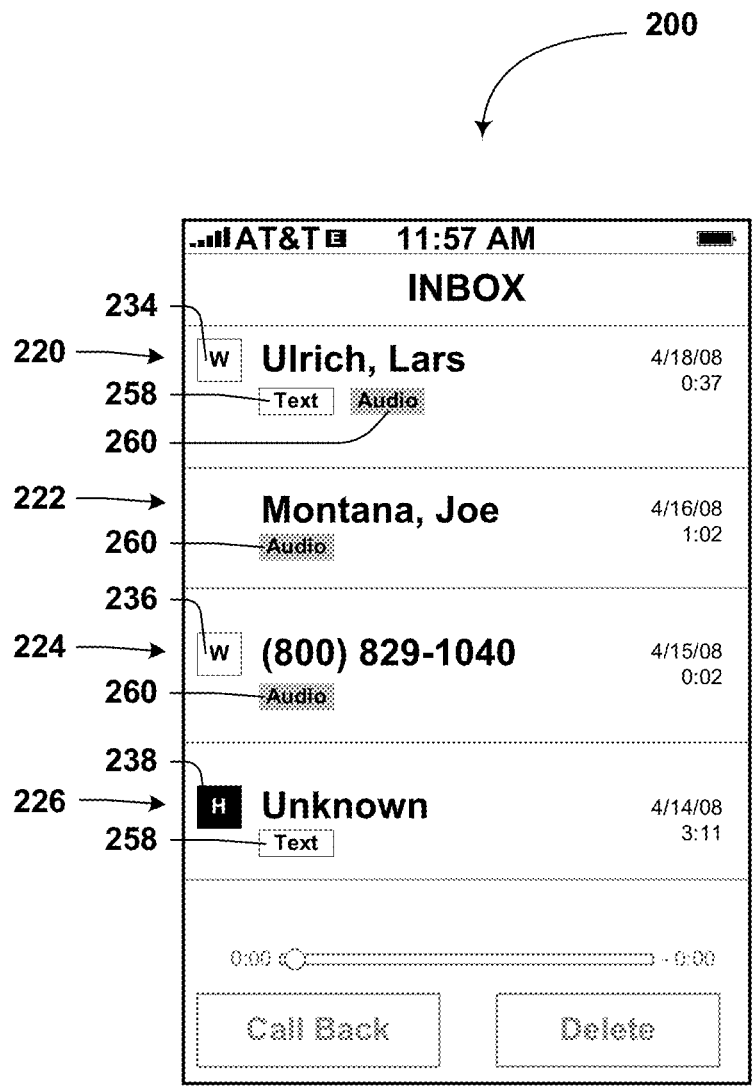
FIG. 8 illustrates another exemplary GUI for a visual voicemail client, according to an exemplary embodiment of the present disclosure.

FIG. 8 illustrates another exemplary representative image from a GUI 200 for a device 18, according to an exemplary embodiment of the disclosure. In the illustrated GUI 200, the messages 220, 222, 224, 226 and indicators 234, 236, 238 described in FIG. 5 are illustrated. Additionally, the exemplary GUI 200 illustrated in FIG. 8 includes message-type indicators 258, 260. In the illustrated embodiment, the message-type indicators 258, 260 are icons, though alternative indicators are contemplated, as explained with respect to the icons 234, 236, 238 of FIG. 5.

The message-type indicator 258 is an icon that informs a user that the message includes a text portion. The message-type indicator 260 is an icon that informs a user that the message includes an audio portion. Messages with both message-type indicators 258, 260 inform a user that the message includes a text portion and an audio portion. It should be understood that additional message formats, for example, video messages, SMS messages, text files, and the like, can be included in the inbox and can be denoted by additional message-type indicators. With reference to the first message 220, the GUI 200 displays information that informs the user of the name of the party who left the message, in this case, Lars Ulrich, the voicemail system to which the call was originally directed, in this case, the user's work telephone line, the date of the message, in this case, Apr. 18, 2008, the duration of the message, in this case, 0 minutes and 37 seconds, and the message-type, in this case a text voicemail and an audio voicemail. Other information, for example, priority levels, calling party presence indicators, and the like, can be displayed as well. A user can use some or all of the displayed information to screen messages or to prioritize messages without listening to or viewing the message content.

While the preceding description has described voicemail messages primarily in the context of audio and text messages, it should be appreciated that the VMSs 24, 26, 28 can also process, store, transfer, download, forward, and consolidate (handle) video messages, if desired. In the event that the VMSs 24, 26, 28 are configured to handle video messages, many of the same processes described above with respect to video and text messages can be used to handle the messages. For example, a video file can include a video component and an audio component. As such, the VMS 24 can record, store, forward, transfer, download, and/or consolidate the audio file, the video file, or both. The conversion can include a speech to text converter, CODECs, and the like, as explained above. As such, a VMS 24, 26, 28 can receive, store, transfer, download, forward and/or consolidate messages as video, audio, text, combinations thereof, and the like.

It must be understood that the illustrated GUIs are exemplary only and other contemplated user interfaces, screen layouts, selection methods, and the like are contemplated, including an embodiment of the VMS 24, 26, 28 that does not provide a GUI at the user's device, the calling party's device, or either device. Furthermore, a selection can be made using various embodiments of softkeys and/or key selections on a mobile or stationary telephone keypad, for example, and is not limited to the illustrated GUI. Additional and/or alternative selector switches and joysticks can be used to select a desired option or icon corresponding to a desired option. Input methods can also include touch screens or voice commands. Any desired screen layout or format can be used, including plain text and icons, for example.

It should also be understood that different delivery methods and/or systems may be required to deliver text voicemail messages and other voicemail messages, e.g., audio, video and/or visual voicemail messages. In some embodiments of the present disclosure, the audio, video, and/or text portions can be combined and stored as one item, as illustrated in FIG. 8. It should be appreciated that providing this feature may require associating the different formats with one another, for example, by assigning identifying data to the message components and associated the message components to reflect that the message components are related. This can allow the two or more message types to be joined into one menu item. If the message components are delivered independently of one another, the first delivered message component can create the message entry at the device. If a message format is not available, or is disabled, then the visual voicemail UI can include a place holder indicating that the missing portion of the message is not available. For example, if a translation or speech to text module is disabled, an indication that a text or audio portion of a message can be included to inform the user accordingly. Alternatively, the place holder can be blank if no text portion is available, as was illustrated in FIG. 8. If a user's account does not support delivery of a format, then the UI could be configured to omit any indication of that format, for example. Other iterations, options, and combinations are contemplated and included in the scope of the appended claims.

It should also be understood that the methods and systems illustrated in FIGS. 1-8 are exemplary and that other embodiments are contemplated. For example, in some embodiments, the MVMS 28 can be programmed with more than one greetings, and one or more of the greetings can correspond to one or more SVMSs 24, 26. As such, the MVMS 28 can be configured to play a greeting corresponding to the voicemail system 24, 26, 28 to which the incoming call was originally directed. Such functionality can help reduce confusion on the part of a calling party, for example, a calling party who hears a "work" voicemail system greeting when he/she dialed the called party's "home" number. In other embodiments, the SVMSs 24, 26 can be configured to play a greeting and then forward the call to an MVMS 28 for message storage. The SVMSs 24, 26 can be configured to forward the call with a message informing the calling party that the call is being forwarded to an MVMS 28.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

We claim:

1. A method comprising:
   receiving a call at a voicemail system;
   determining, by the voicemail system, if the voicemail system comprises a slave voicemail system;
   determining, by the voicemail system, if the voicemail system comprises a master voicemail system;
   if the voicemail system determines that the voicemail system comprises the master voicemail system, storing, by the voicemail system, a message associated with the call; and
   if the voicemail system determines that the voicemail system comprises the slave voicemail system, passing the call to a further voicemail system that comprises the master voicemail system.

2. The method of claim 1, wherein storing the message comprises storing the message and call data associated with the message at a memory location associated with the master voice mail system if a determination is made that the voicemail system comprises the slave voicemail system and the voicemail system is configured to forward incoming calls.

3. The method of claim 1, further comprising:
   storing message content and call data associated with the message at a memory location associated with the slave voicemail system if a determination is that that the voicemail system comprises the slave voicemail system.

4. The method of claim 3, further comprising transferring, to the master voicemail system, the stored message content and call data associated with the message.

5. The method of claim 3, further comprising:
generating, at the master voicemail system, source data relating to the voicemail system to which the call was originally directed; and
appending the source data to the message content and the call data.

6. The method of claim 1, further comprising, if the determination is that the voicemail system comprises the slave voicemail system:
storing message content and call data associated with the message at a memory location associated with the slave voicemail system;
sending a notification to the master voicemail system that a message has been deposited;
receiving, at the slave voicemail system, a request to transfer the stored message content and call data to the master voicemail system; and
transferring the stored message content and call data associated with the message to the master voicemail system.

7. The method of claim 1, wherein storing the message comprises storing audio data.

8. The method of claim 1, wherein storing the message comprises storing text data.

9. The method of claim 1, wherein storing the message comprises storing audio data and text data.

10. A method comprising:
receiving a call at a voicemail system;
determining, by the voicemail system, if the voicemail system comprises a slave voicemail system;
determining, by the voicemail system, if the voicemail system comprises a master voicemail system;
if the voicemail system determines that the voicemail system comprises the master voicemail system, storing, by the voicemail system, a message associated with the call, obtaining a message and call data associated with the call, creating a source tag associated with the call, and associating the message and the call data with the source tag; and
if the voicemail system determines that the voicemail system comprises the slave voicemail system, determining if the call is to be handled by the slave voicemail system or passed to the master voicemail system.

11. The method of claim 10, further comprising:
if the voicemail system determines that the call is to be handled by the slave voicemail system,
obtaining the message and the call data associated with the call, and
determining if a notification is to be generated.

12. The method of claim 11, further comprising:
if the voicemail system determines that the notification is to be generated, sending a message waiting notification to the master voicemail system.

13. The method of claim 11, further comprising:
transferring, to the master voicemail system, the message and the call data.

14. The method of claim 10, further comprising:
if the voicemail system determines that the call is to be forwarded to the master voicemail system, forwarding the call to the master voicemail system to obtain the message, the call data, and the source tag.

15. A mobile device comprising:
a processor; and
a memory that stores computer executable instructions that, when executed by the processor, cause the processor to perform operations comprising
receiving a message waiting notification indicating that a message is stored at a master voicemail system that stores messages received at the master voicemail system and a slave voicemail system,
requesting a message header from the voicemail system, the message header indicating a source of the message, the source comprising the master voicemail system or the slave voicemail system, and
generating a user interface that presents the message, the user interface comprising a view of a message inbox that includes a representation of the message and an indicator of the source of the message.

16. The mobile device of claim 15, wherein the user interface further comprises a further indicator that indicates a format for the message.

17. The mobile device of claim 16, wherein the further indicator indicates that the message comprises a text message.

18. The mobile device of claim 16, wherein the further indicator indicates that the message comprises an audio message.

19. The mobile device of claim 15, further comprising computer executable instructions that, when executed by the processor, cause the processor to perform operations further comprising:
generating a further user interface comprising
controls to enable delivery options for delivering audio voicemails and text voicemails, and
further controls to edit account settings associated with the master voicemail system and the slave voicemail system.

20. The mobile device of claim 15, further comprising computer executable instructions that, when executed by the processor, cause the processor to perform operations further comprising:
generating a further user interface comprising controls to set account settings associated with the voicemail system, the account settings comprising
a nickname for the voicemail system,
a dial-in number for the voicemail system, and
a voicemail password for the voicemail system,
a forwarding option to enable forwarding of calls associated with the voicemail system, and
an account type option to indicate that the voicemail system comprises the slave voicemail system or the master voicemail system.

* * * * *